US008856729B2

(12) United States Patent
Moore et al.

(10) Patent No.: US 8,856,729 B2
(45) Date of Patent: Oct. 7, 2014

(54) SYSTEMS AND METHODS FOR DEVELOPING MULTI-PLATFORM APPLICATIONS FOR COMPUTING DEVICES

(71) Applicants: Stephen Trey Moore, San Antonio, TX (US); William Cameron Powell, San Antonio, TX (US)

(72) Inventors: Stephen Trey Moore, San Antonio, TX (US); William Cameron Powell, San Antonio, TX (US)

(73) Assignee: AirStrip IP Holdings, LLC, San Antonio, TX (US)

( * ) Notice: Subject to any disclaimer, the term of this patent is extended or adjusted under 35 U.S.C. 154(b) by 30 days.

(21) Appl. No.: 13/716,974

(22) Filed: Dec. 17, 2012

(65) Prior Publication Data

US 2013/0167111 A1 Jun. 27, 2013

Related U.S. Application Data

(60) Provisional application No. 61/579,954, filed on Dec. 23, 2011.

(51) Int. Cl.
*G06F 9/44* (2006.01)

(52) U.S. Cl.
USPC ............................ 717/105; 717/104; 715/700

(58) Field of Classification Search
USPC ......... 717/113, 177–178, 104–109, 120–123; 715/700
IPC ..................................... G06F 8/20,8/38, 17/248
See application file for complete search history.

(56) References Cited

U.S. PATENT DOCUMENTS

| | | | | |
|---|---|---|---|---|
| 6,266,805 B1 * | 7/2001 | Nwana et al. | ................. | 717/104 |
| 6,342,901 B1 * | 1/2002 | Adler et al. | .................. | 715/700 |
| 6,601,234 B1 * | 7/2003 | Bowman-Amuah | .......... | 717/108 |
| 6,662,357 B1 * | 12/2003 | Bowman-Amuah | .......... | 717/120 |
| 6,976,253 B1 * | 12/2005 | Wierman et al. | .............. | 717/177 |
| 7,240,326 B2 * | 7/2007 | Barker et al. | ................. | 717/105 |
| 7,243,334 B1 * | 7/2007 | Berger et al. | ................. | 717/109 |
| 7,434,217 B2 * | 10/2008 | Morris | ......................... | 717/177 |
| 7,584,470 B2 * | 9/2009 | Barker et al. | ................. | 717/177 |
| 7,827,527 B1 * | 11/2010 | Chiluvuri | ...................... | 717/109 |
| 7,984,417 B2 * | 7/2011 | Ben-Zvi et al. | ............... | 717/106 |
| 7,984,423 B2 * | 7/2011 | Kodosky et al. | .............. | 717/113 |
| 8,209,002 B2 * | 6/2012 | Vajdic et al. | .................. | 600/512 |
| 8,397,211 B2 * | 3/2013 | Ionfrida et al. | ............... | 717/105 |

(Continued)

OTHER PUBLICATIONS

Arapov et al, "Developing Web of Data Applications from the Browser" ACM, pp. 599-601, 2014.*

(Continued)

*Primary Examiner* — Anil Khatri
(74) *Attorney, Agent, or Firm* — Fish & Richardson P.C.

(57) ABSTRACT

Implementations of the present disclosure include actions of transmitting a first user interface engine (UIE) to a first computing device, the first UIE being specific to a first operating system of the first computing device, transmitting a second UIE to a second computing device, the second UIE being specific to a second operating system of the second computing device, the first operating system being different from the second operating system, and transmitting one or more templates to the first computing device and the second computing device, the one or more templates being agnostic to the first operating system and the second operating system, each of the one or more templates being processable using the first UIE and the second UIE to display a first user interface and a second user interface on the first mobile device and the second mobile device, respectively.

9 Claims, 5 Drawing Sheets

(56) References Cited

U.S. PATENT DOCUMENTS

| | | | |
|---|---|---|---|
| 8,522,194 B2* | 8/2013 | Kaetker et al. | 717/104 |
| 8,543,972 B2* | 9/2013 | Chen et al. | 717/105 |
| 8,583,091 B1* | 11/2013 | Delker et al. | 455/414.3 |
| 8,656,349 B2* | 2/2014 | Lochmann | 717/107 |
| 2006/0079995 A1 | 4/2006 | Warn et al. | |
| 2007/0288856 A1 | 12/2007 | Butlin et al. | |
| 2008/0127169 A1 | 5/2008 | Malasky et al. | |
| 2010/0087179 A1 | 4/2010 | Makavy et al. | |

OTHER PUBLICATIONS

Tatsubori et al, "HTML Templates that Fly", ACM, pp. 951-960, 2009.*

Frosini et al, "User Interface Distribution in Multi-Device and Multi-User Environments with Dynamically Migrating Engines", ACM, pp. 55-64, 2014.*

Sherchan et al, "Context-Sensitive User Interfaces for Semantic Services", ACM Transactions on Internet Technology, vol. 11, No. 3, Article 14, pp. 1-27, 2012.*

Authorized officer Shane Thomas, International Search Report and Written Opinion of the International Searching Authority for International Application No. PCT/US2012/070040, mailed Mar. 15, 2013, 13 pages.

Plaintiffs' Complaint for Patent Infringement, *Airstrip Technologies, Inc. et al. v. mVISUM, Inc.*, Civil Action No. 1:12-cv-07776-JFK, United States District Court for the Southern District of New York, Document 1, filed Oct. 18, 2012, 30 pages.

Defendant's Answer and Counterclaim, *Airstrip Technologies, Inc. et al. v. mVISUM, Inc.*, Civil Action No. 1:12-cv-07776-JFK, United States District Court for the Southern District of New York, Document 29, filed Apr. 5, 2013, 13 pages.

GE Healthcare, "Web Viewer and Pocket Viewer," 2007, retrieved from http://www3.gehealthcare.com/~/media/Downloads/us/Product/Product-Categories/Patient-Monitoring/Careports/Mobile-Viewers/GEHealthcare-Web-Viewer-Pocket-Viewer-ProductSpec.pdf?Parent=%7B1ED25767-3F69-413B-8C56-3DDEA5CEF31F%7D, 4 pages.

Edward H. Schmuhl et al., "HP PalmVue: A New Healthcare Information Product," Hewlett-Parkard Journal, Article 8, Jun. 1996, retrieved from http://www.hpl.hp.com/hpjournal/96jun/jun96a8.pdf, pp. 12-17.

MobileInfo, "Data Critical's StatView™ Alarm Notification System," Jun. 2000, retrieved from http://www.mobileinfo.com/Applications_Vertical/Healthcare_Applications/StatView.htm, 2 pages.

Telecompaper, "Data Critical Launches Rhythmstat XL Medical System," Jan. 8, 1998, retrieved from http://www.telecompaper.com/news/data-critical-launches-rhythmstat-xl-medical-system--26725, 2 pages.

U.S. Food and Drug Administration, Protecting and Promoting Your Health, "MAUDE Adverse Event Report: Data Critical Corp. Impactpaging System," Nov. 19, 2000, retrieved on Apr. 8, 2013 from <www.accessdata.fda.gov/scripts/cdrh/cfdocs/cfmaude/detail.cfm?mdrfoi_id=312735>, 2 pages.

Department of Health & Human Services, Food and Drug Administration, Center for Devices and Radiological Health, 510(k) Summary and approval letter for FlexView™ Clinical Monitoring System (K003998), Mar. 7, 2001, 4 pages.

Department of Health & Human Services, Food and Drug Administration, Center for Devices and Radiological Health, 510(k) Summary and approval letter for AlarmView™ Wireless Data Network System (K010912), Apr. 5, 2001, 4 pages.

Department of Health & Human Services, Food and Drug Administration, Center for Devices and Radiological Health, 510(k) Summary and approval letter for Agilent Information Center (AIC) Software Release D.0 (K011093), May 1, 2001, 5 pages.

Department of Health & Human Services, Food and Drug Administration, Center for Devices and Radiological Health, 510(k) Summary and approval letter for Mobile-PatientViewer™ (K011436), Jul. 5, 2001, 5 pages.

Department of Health & Human Services, Food and Drug Administration, Center for Devices and Radiological Health, 510(k) Summary and approval letter for FlexView™ Clinical Monitoring System (K011999), Jul. 24, 2001, 4 pages.

Department of Health & Human Services, Food and Drug Administration, Center for Devices and Radiological Health, 510(k) Summary and approval letter for AlarmView™ Wireless Data Network System (K012005), Jul. 24, 2001, 4 pages.

Department of Health & Human Services, Food and Drug Administration, Center for Devices and Radiological Health, 510(k) Summary and approval letter for AlarmView™ Wireless Data Network System (K013156), Oct. 19, 2001, 4 pages.

Department of Health & Human Services, Food and Drug Administration, Center for Devices and Radiological Health, 510(k) Summary and approval letter for Datex-Ohmeda S/5 Web Viewer, Datex-Ohmeda S/5 Pocket Viewer and Datex-Ohmeda S/5 Cellular Viewer with L-WEB04 software (K052975), Jan. 20, 2006, 7 pages.

Department of Health & Human Services, Food and Drug Administration, Center for Devices and Radiological Health, 510(k) Summary and approval letter for Web Viewer, Pocket Viewer and Cellular Viewer with L-WEB05 software (K061994), Aug. 11, 2006, 4 pages.

Department of Health & Human Services, Food and Drug Administration, Center for Devices and Radiological Health, 510(k) Summary and approval letter for RhythmStat XL System (K971650), Dec. 4, 1997, 9 pages.

Department of Health & Human Services, Food and Drug Administration, Center for Devices and Radiological Health, 510(k) Summary and approval letter for Cardio-Pager™ System (K973527), Mar. 31, 1998, 6 pages.

Department of Health & Human Services, Food and Drug Administration, Center for Devices and Radiological Health, 510(k) Summary and approval letter for Hewlett-Packard M2605A Viridia Wave Viewer (K974567), Jan. 20, 1998, 5 pages.

Department of Health & Human Services, Food and Drug Administration, Center for Devices and Radiological Health, 510(k) Summary and approval letter for StatView™ System (K990378), Sep. 20, 1999, 6 pages.

Department of Health & Human Services, Food and Drug Administration, Center for Devices and Radiological Health, 510(k) Summary and approval letter for AlarmView™ System (K992848), Nov. 19, 1999, 6 pages.

Authorized officer Athina Nickitas-Etienne, International Preliminary Report on Patentability for International Application No. PCT/US2012/070040, mailed Jul. 3, 2014, 8 pages.

* cited by examiner

SYSTEMS AND METHODS FOR DEVELOPING MULTI-PLATFORM APPLICATIONS FOR COMPUTING DEVICES

CROSS-REFERENCE TO RELATED APPLICATIONS

This application claims the benefit and priority of U.S. Provisional Application Ser. No. 61/579,954, filed Dec. 23, 2011, the entire contents of which are hereby incorporated by reference in the entirety.

FIELD

The present application relates to applications that can be executed using computing devices.

SUMMARY

Implementations of the present disclosure can be useful in applications that are to be executed across disparate computing device operating systems. In accordance with the present disclosure, a framework is provided that enables a developer can provide a mobile application for all of the differing mobile platforms as opposed to providing multiple versions of the same mobile application for each differing mobile platform. The mobile application is built once and deployed to many differing mobile platforms, regardless of the type of mobile platform. The mobile application fully utilizes the mobile platform to give the resemblance that the mobile application runs natively on the mobile platform. Thus, the mobile device translates the mobile application to have a native motif (e.g., "look and feel") of the mobile platform thereof. The translated mobile application embraces the unique properties, features, function, and usability of each mobile platform. In some examples, a motif can include font style, font color, font size, background color, foreground color and/or other visual characteristics that are associated with the mobile platform.

In general, aspects of the subject matter described in this specification can be embodied in methods that include the actions of transmitting a first user interface engine to a first computing device, the first user interface engine being executable on the first computing device and being specific to a first operating system of the first computing device, transmitting a second user interface engine to a second computing device, the second user interface engine being executable on the second computing device and being specific to a second operating system of the second computing device, the first operating system being different from the second operating system, and transmitting one or more templates to the first computing device and the second computing device, the one or more templates being agnostic to the first operating system and the second operating system, each of the one or more templates being processable using the first user interface engine and the second user interface engine to display a first user interface and a second user interface on the first mobile device and the second mobile device, respectively. Other implementations of this aspect include corresponding systems, apparatus, and computer program products.

These and other implementations can optionally include one or more of the following features: each of the one or more templates defines components to be displayed on a page, the page being included in each of the first user interface and the second user interface; the page comprises a first motif when displayed in the first user interface and a second motif when displayed in the second user interface, the first motif being associated with the first operating system and the second motif being associated with the second operating system; actions further include receiving user input from an application developer, the user input defining the one or more templates; actions further include: receiving data, and transmitting the data to each of the first computing device and the second computing device to enable the first computing device and the second computing device to process the data using the first user interface engine and the second user interface engine to display the data in each of the first user interface and the second user interface; the first user interface engine and the second user interface engine include a first template engine and a second template engine, respectively, the first template engine being specific to the first operating system and the second template engine being specific to the second operating system; and actions further include receiving a first request to download an application, the first request being generated from the first computing device, and receiving a second request to download the application, the second request being generated from the second computing device, wherein transmitting the one or more templates to the first computing device and the second computing device occurs in response to the first request and the second request.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Particular implementations of the present disclosure can be implemented to realize one or more of the following advantages. The application development platform (ADP) of the present disclosure can significantly shorten the time-to-market of application development and reduces ongoing costs associated with maintaining applications across multiple platforms. Further, the ADP of the present disclosure eliminates the cost of porting each application to a new type of device or platform. Implementations of the present disclosure further reduce the hardware and software infrastructure that is required to develop and maintain applications for multiple platforms.

The details of one or more implementations of the present disclosure are set forth in the accompanying drawings and the description below. Other features, objects, and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to an application development platform (ADP) that separates native graphical user interface (GUI) and operating system components from the application logic. In this manner, the application development platform provides a "build once deploy to many" architecture that translates and interprets application logic into the native languages of each operating system, and embraces the unique properties, features, function, and usability of each operating system. In particular, one application can be developed using the ADP of the present disclosure and can be executed with a first operating system, with the look and feel of applications purpose-built for the first operating system, and can be executed with a different, second operating system, with the look and feel of applications purpose-built for the second operating system. In this manner, each device type and each GUI presents a very specific user experience to satisfy the user expectation that the applications will behave in a manner that is consistent to the type of mobile device that they are using.

The ADP of the present disclosure separates the GUI and operating system specific functionality from the business logic of the application that is to be implemented across multiple, different platforms. In doing so, viewers, discussed in further detail below, render the application using the native look and feel of the each device platform. In this manner, a developer using the ADP of the present disclosure can build an application once, and the application is dynamically delivered as device-specific content to various devices having differing operating systems.

In some implementations, the ADP provides a library of cross-platform, common building-block components that enable rapid development of applications. In some examples, components can be industry specific. For example, example components used for the development of healthcare-related applications can include: charts and graphs, waveform viewers, patient lists, medication lists, lab results, tabular data, annotations and GUI navigational elements. For example, a medical-related application can be built using any of the example components, can be quickly defined at an ADP server and can be instantly viewable on each device, regardless of type.

Figure 1:
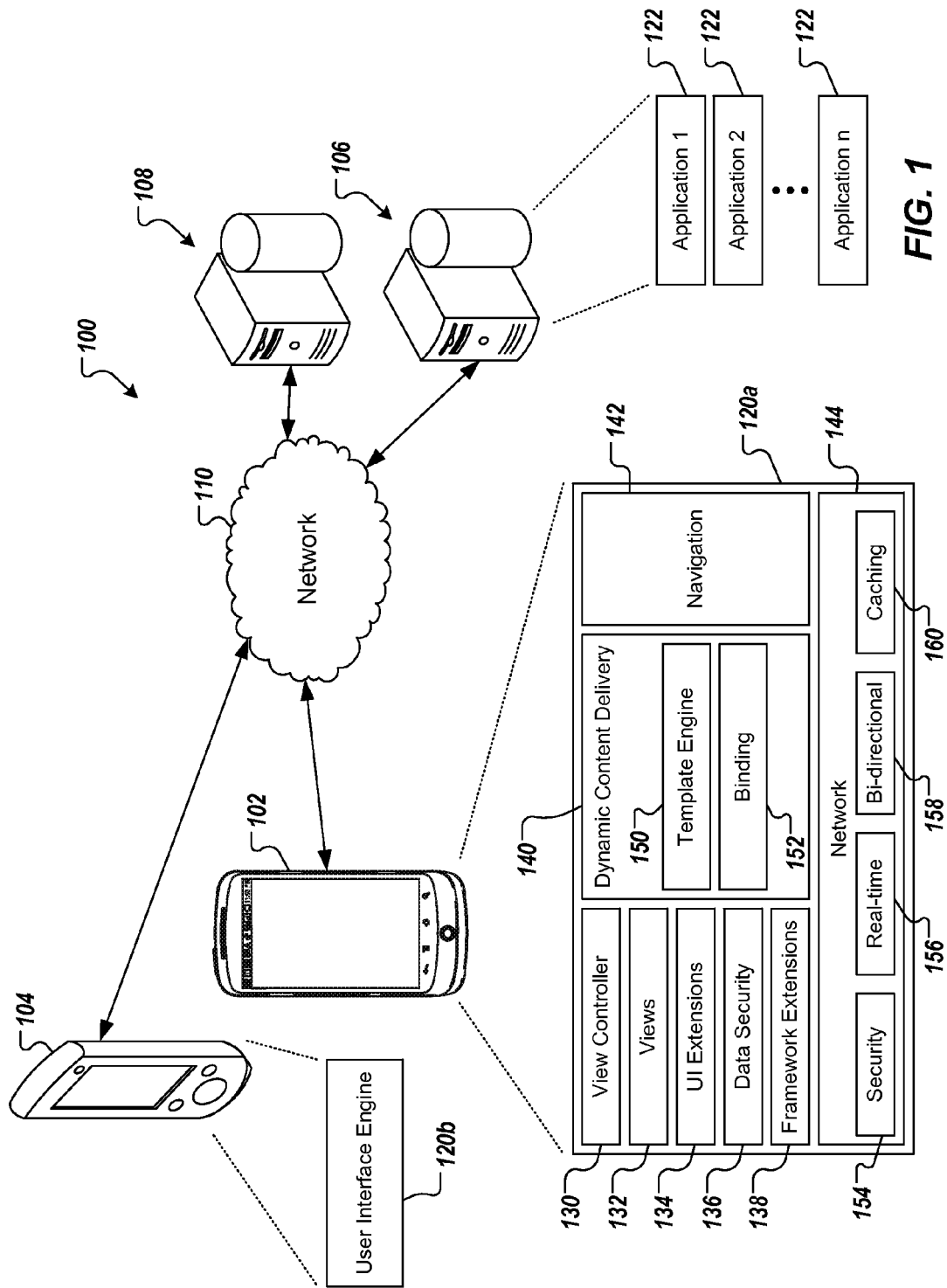
FIG. 1 depicts an example network architecture.

FIG. 1 depicts an example communication system 100 including mobile computing devices 102, 104, server systems 106, 108 and a network 110. Mobile computing devices 102, 104 can each communicate with one or more of the server systems 106, 108 over the network 110. The mobile computing device 102 can be a first type of computing device and can operate using a first operating system. The mobile computing device 104 can be a second type of computing device and can operate using a second operating system. The first operating system is different from the second operating system.

Although the mobile computing devices 102, 104 are illustrated as smartphone-type devices, each can each include any type of computing device such as a tablet computer, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The network 110 can include a large computer network, such as a local area network (LAN), wide area network (WAN), the Internet, a cellular network, or a combination thereof connecting any number of mobile computing devices, fixed computing devices, and server systems. The server systems 106, 108 can each include one or more computing devices and one or more machine-readable repositories, or databases.

In some implementations, an ADP includes a user interface engine that interface with one or more applications. In the depicted example, a user interface engine 120a is installed and is executed on the mobile computing device 102, and a user interface engine 120b is installed and is executed on the mobile computing device 104. The user interface engines 120a, 120b can respectively include one or more components that are specific to an operating system of the device, on which the user interface engine 120a, 120b executes. In the depicted example, the user interface engine 120a is specific to the operating system of the mobile computing device 102, and the user interface engine 120b is specific to the operating system of the mobile computing device 104.

One or more applications 122 are installed and are executed on the server system 106. Accordingly, each application 122 is provided as a cloud-hosted application that can receive input from and provide output to respective user interface engines (e.g., user interface engines 120a, 120b).

For purposes of brevity, components of the user interface engine 120a are described in further detail herein. It is appreciated, however, that the user interface engine 120b can include the same components and that one or more components of each of the user interface engines 120a, 120b are specific to the respective operating systems.

In the depicted example, the user interface engine 120a includes one or more view controller modules 130, a views module 132, a user interface (UI) extensions module 134, a data security module 136, a framework extensions module 138, a dynamic content delivery module 140, a navigation module 142 and a network module 144. The dynamic content delivery module 140 can include a template engine sub-module 150 and a binding sub-module 152. The network module 144 can include a security sub-module 154, a real-time sub-module 156, a bi-directional sub-module 158 and a caching sub-module 160.

In some examples, the view controllers module 130 manages the layout, or placement of graphical components of the application on the mobile computing device and manages user interactions with the graphical components (e.g., clicks). The views module 132 accesses one or more design templates provided with the application. In some examples, each design template corresponds to a view that is presented during execution of the application (e.g., View 1—patient list; View 2—data traces). In some examples, the UI extensions module 134 provides a custom toolbox of components that can be used to extend functionality associated with the particular operating system. For example, the UI extensions module 134 can enable the use of one or more user interactions (e.g., momentum scrolling, swiping) that might not be functionality provided with the native operating system. The data security module 136 can enforce security requirements by accessing one or more security libraries. An example security requirement can include multi-factor authentication for authenticating a user of the mobile computing device 102.

The dynamic content delivery module 140 processes data and instructions to display content in UIs defined by the application. The dynamic content delivery module 140 is specific to the particular operating system of the mobile computing device 102. In some examples, the template engine 150 is operating system specific and process instruction sets provided by the application to render UIs on a display of the mobile computing device 102. In short, the template engine 150 translates operating system agnostic instructions to render operating system specific graphics. For example, the application can provide operating system agnostic instructions that a table including labels X, Y and Z is to be displayed and is to be populated with data. The template engine 150 can receive the instructions and can translate the instructions to enable the table to be rendered within the context of the particular operating system. In this manner, the same instructions can be provided to various operating systems to render the desired graphics in respective native formats.

In some implementations, the template engine 150 can perform operations (e.g., create, modify, merge) model data. In some examples, model data can include layout data and true page context dependent data, with data used to determine how the UI will be constructed (e.g., what resources will be used, where they reside, etc.) and bound. Pages of the UI can be constructed and include instructions for display. In some implementations, the template engine 150 facilitates the final creation of a page. In some examples, client-side logic can be used to perform operations (e.g., create, modify, merge) on the model data and UI data. In some examples, the template engine 150 can transform a given data set (e.g., filtering, merging, appending) and/or change resources used to render a page based on a given rule (e.g., device type). In some examples, the template engine 150 manages data caching/data retrieval by providing the ability to forward model and/or parameter information collected for/on a given page, and seeding it into a URL that can be used to navigate to another page or for data retrieval. For instance, the first page used to display biographical information can forward the underlying biographical data to the next page that is to be displayed through the template. In this manner, there is no need to re-retrieve the biographical data unless otherwise specified by the next page (e.g., through a caching policy). In some examples, the template engine 150 uses a simple syntax set to perform logic constructs and value substitutions. Once a syntax is found in a give file or string, the template engine 150 processes the syntax and performs value substitutions based on what data it is given to substitute with. The template engine 150 is completely customizable. In this manner, more features can be easily added.

The navigation module 142 maintains the navigational feel of the specific operating system. In this manner, when a user interfaces with the application using the mobile device 102, the navigational commands for navigating the screens of the application remain consistent with the navigational commands used by the particular operating system. In some examples, the navigation module can be operating system specific, while presenting an interpretation derived from the template engine 150.

The network module 144 enables network communication between the user interface engine 120a and one or more server systems (e.g., the server system 106, 108). In some examples, the network module 144 enforces security requirements and manages the transfer of data between the mobile computing device 102a and the one or more server systems.

Implementations of the present disclosure will be described by way of example with reference to FIGS. 2-4. By way of non-limiting example, healthcare-related applications will be described. Such applications can include, for example, AirStrip OB, AirStrip Cardiology and AirStrip Patient Monitoring provided by AirStrip Technologies, LLC of San Antonio, Tex. It is appreciated, the implementations of the ADP of the present disclosure are not limited to healthcare-related applications.

Figure 2:
FIG. 2 depicts an example user interface for generating an application.

FIG. 2 depicts a graphical user interface (GUI) that can be accessed by an application developer to generate an application using the ADP. In some examples, an application editor can be hosted using one or more server systems, which the developer can access to generate applications. The GUI 200 of FIG. 2 can be displayed on a client computing device and can receive input from the developer using the client computing device. The input can be provided to backend server systems to generate one or more views to be displayed by the application.

In the example of FIG. 2, a charts menu 202, a plot areas menu 204, a category axes menu 206 and a legends menu 208 are provided. The charts menu 202 lists a plurality of already defined charts that can be displayed by the application. For example, an antiarrhythmic chart, a blood pressure chart and a hemodynamics chart, among others, can be selected from the charts menu 202 to be included in the application. The developer can define a new chart by selecting the "New Chart" option provided in the charts menu 202.

The plot areas menu 204 lists one or more already defined plot areas that can be used with the charts of the charts menu 202. The developer can define a new plot area by selecting the "New PlotArea" option provided in the plot areas menu 204. The category axes menu 206 lists one or more already defined category axes that can be used with the charts of the charts menu 202. The developer can define a new category axis by selecting the "New CategoryAxis" option provided in the category axes menu 206. The legends menu 208 lists one or more already defined legends that can be used with the charts of the charts menu 202. The developer can define a new legend by selecting the "New Legend" option provided in the legends menu 208.

Using healthcare as an example scenario, a developer can generate a healthcare-related application using the ADP. For example, the developer can generate an application that displays patient data in one or more charts or tables. The developer can construct and select which charts are to be included in the application using the GUI 200 (e.g., accessing the charts menu 202). In one example, the developer can define the application to include a blood pressure chart and a hemodynamics chart. The developer can construct and select which tables are to be included in the application using the GUI 200 (e.g., accessing a tables menu (not shown)). In one example, the developer can define the application to include a patient data table that provides the patient name, age, the facility where the patient is being treated, and/or any other patient-related data.

Generally, the application can provide one or more instruction sets for rendering charts and tables in a UI of a computing device. The application can be written using a computer programming language that can be independent of disparate operating systems employed in various computing devices.

After generating the application, the application can be made available on a server system for download and installation to computing devices. In some examples, the application can be available for download from an application marketplace. The application is operating system agnostic and can be downloaded to any appropriate computing device. The application is operating system agnostic in that the application can be executed on a computing device regardless of the particular operating system operating on the computing device. For example, the application can be downloaded to a first computing devices that operates using a first operating system and can be downloaded to a second computing devices that operates using a second operating system. Respective user interface engines, that are operating system specific, can interface with the application to render GUIs of the application in the respective computing devices. Accordingly, the application provides instructions that are interpreted by the user interface engine to render GUIs of the application with the look and feel of applications purpose-built for the particular operating system. For example, the instructions are interpreted to render charts and/or tables and to populate the charts and/or tables with data. In some examples, a computing device can already have a user interface engine installed thereon. In some examples, the computing device can download the user interface engine that is specific to the operating system of the computing device.

Figure 3:
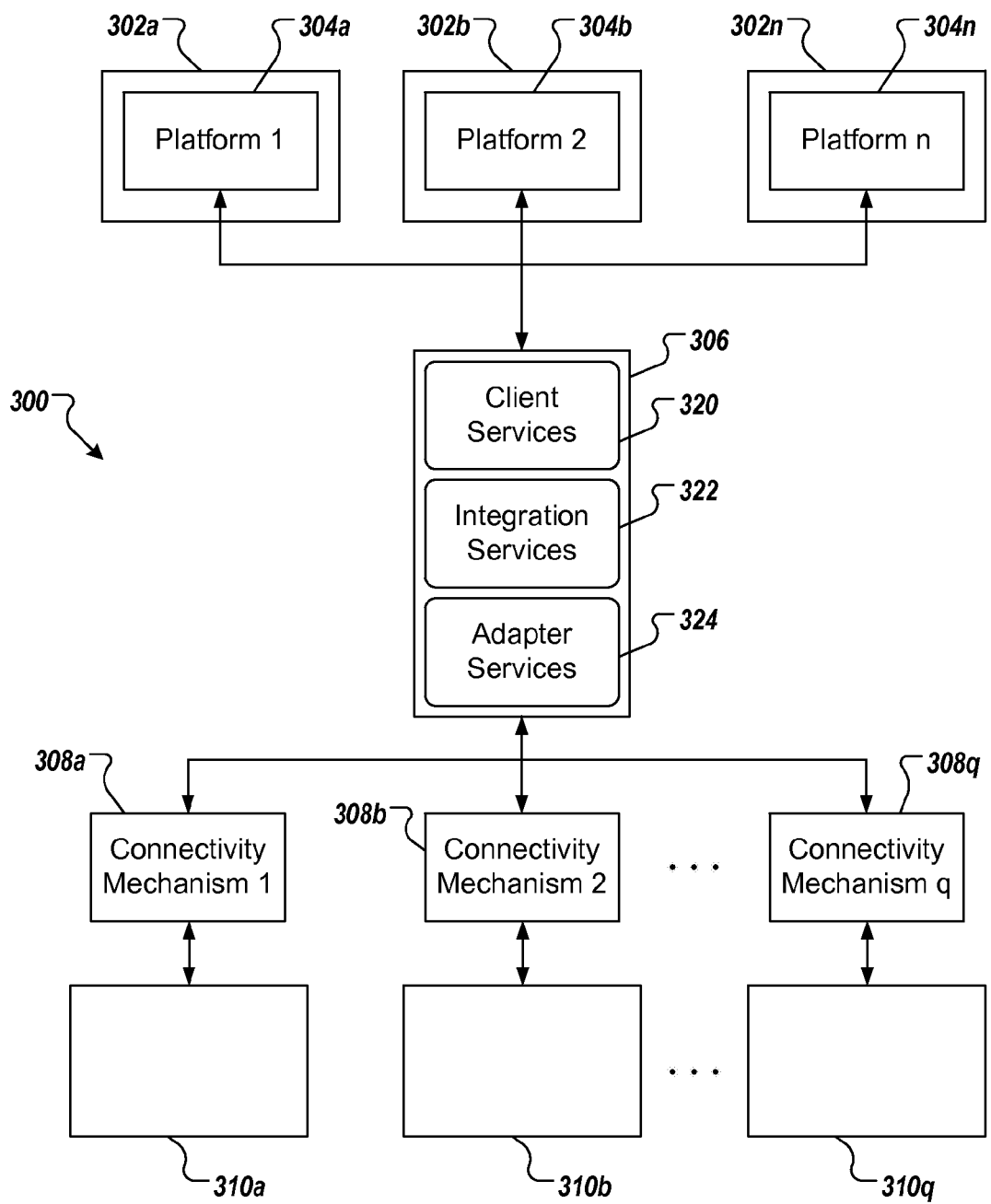
FIG. 3 depicts a functional block diagram of components that can be used to implement an example application across multiple operating systems.

FIG. 3 illustrates an overview of an example system architecture 300 that can operate with implementations of the ADP of the present disclosure. The system architecture includes computing devices 302a, 302b, . . . , 302n, which include respective platforms, or operating systems 304a, 304b, . . . , 304n. The system architecture 300 further includes intermediary components 306, and connectivity mechanisms 308a, 308b, . . . , 308q associated with data sources 310a, 310b, . . . , 310q. In the example healthcare scenario, the data sources 310a, 310b, . . . , 310q can each include an information system, such as a clinical information system (CIS) or a hospital information system (HIS). Each information system can be provided as a server, and supports the acquisition, storage, modification, and distribution of clinical information, such as patient data. Example information systems can include the Integriti Enterprise Wide CIS, the QS Perinatal CIS, and/or the QS Critical Care CIS, each provided by General Electric (GE), the OBiX Perinatal Data System provided by Clinical Computer Systems, Inc., the IntelliVue Clinical Information Portfolio (ICIP), Critical Care and/or OB Trace-Vue Perinatal Data System provided by Royal Philips Electronics, the Essentris Perinatal, Acute Care and/or Critical Care systems provided by CliniComp International, Inc., the CALM Perinatal Data System provided by LMS Medical Systems, the Horizon Lab, Medical Imaging, Cardiology, Emergency Care and/or Perinatal Care provided by McKesson Corporation, and/or the NaviCare WatchChild System provided by Hill-Rom.

The information systems can store patient data provided from patient monitoring devices. Example patient monitoring devices can include maternal/fetal heart rate monitors, blood pressure monitors, respiratory monitors, vital signs monitors, electrocardiogram monitors, oximetry and/or anesthesia monitors. Example patient monitoring devices can include the Corometric Series Monitors, DINAMAP Series Monitors, DASH Series Monitors, and/or Solar Series monitors provided by GE Healthcare, IntelliVue and/or SureSigns Series patient monitors, and/or Avalon Series Fetal Monitors provided by Royal Philips Electronics, and/or Infinity Series patient monitors provided by Draeger Medical.

In the example system architecture 300, the computing devices 302a, 302b, . . . , 302n are client computing devices that each execute a user interface engine in accordance with implementations of the present disclosure. For example, the computing device 302a can correspond to the mobile computing device 102 of FIG. 1 and can execute the user interface engine 120a. The computing device 302b can correspond to the mobile computing device 104 of FIG. 1 and can execute the user interface engine 120b.

The intermediary components 306 can be provided in a data management system (DMS) that can be provided as a server system, or a virtual server system, that runs server software components, and can include data storage including, but not limited to, a database and/or flat files. For example, the DMS can be provided as the server system 108 of FIG. 1. An example DMS can include the AirStrip Server provided by AirStrip Technologies, LLC, which AirStrip Server includes AirStrip Server Components installed therein.

The intermediary components 306 include a client services module 320, an integration services module 322, and an adapter services module 324. The functions as an intermediary between the platforms 304a, 304b, . . . , 304n resident on the respective computing devices 302a, 302b, . . . , 302n and the data sources 310a, 310b, . . . , 310q. A plurality of different platforms 304a, 304b, . . . , 304n are illustrated to exemplify the ability of the DMS to transfer data to and from any data source 310a, 310b, . . . , 310n and any computing device 302a, 302b, . . . , 302n. The connectivity mechanisms 308a, 308b, . . . , 308q enable communication between the DMS and a particular data sources 310a, 310b, . . . , 310q.

Figure 4:
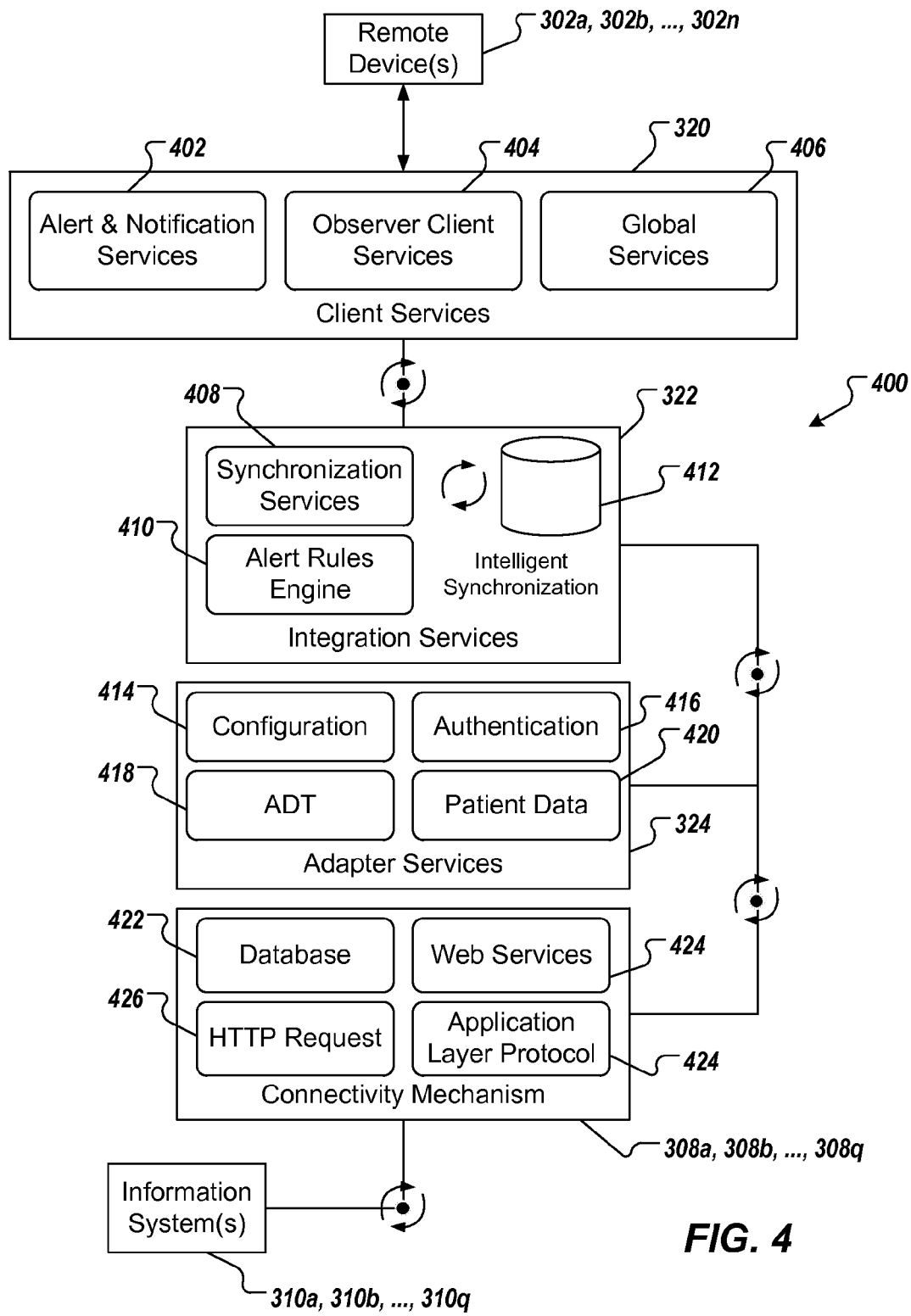
FIG. 4 is a more detailed view of the functional block diagram of FIG. 3.

In the example structure 400 illustrated in FIG. 4, the client services module 320 includes an alert and notification services module 402, an observer client services module 404, and a global services module 406. The integration services module 322 includes a synchronization services module 408, and an alert engines rule 410. The synchronization services module 408 can communicate with a synchronization database 412 to provide so-called intelligent synchronization. The adapter services module 324 includes a configuration module 414, an authentication module 416, an admission, discharge and transfer (ADT) module 418, and a patient data module 420.

The alert and notification services module 402 sends alerts and/or notifications to the computing devices 302a, 302b, . . . , 302n. The observer client services module 404 facilitates communication between client applications (e.g., user interface engines), running on the computing devices 302a, 302b, . . . , 302n, and backend server components that provide access to application logic and data. The observer client services module 404 transmits data through a formatted request, and receives data in a proprietary data format. An example data format includes JavaScript Object Notation (JSON), which is a lightweight computer data interchange format that provides a text-based, human-readable format for representing simple data structures and associative arrays, called objects. The global services module 406 communicates with the user interface engines running on the respective computing devices 302a, 302b, . . . , 302n and performs registration and application configuration settings.

The integration services module 322 is responsible for routing requests that are received from the observer client services module 404 to retrieve and package requested data, and to send a corresponding response. More specifically, the integration services module 322 requests data from the adapter services module 324, or from the synchronization database 412 depending on how the particular DMS is configured. If the DMS is configured to use a vendor adapter, the request goes directly to the adapter services module 324 to retrieve the data. If the DMS is configured for synchronization, the data is retrieved from the synchronization database 412. The synchronization services module 408 communicates with the adapter services module 324 to maintain the synchronization database 412 current using intelligent synchronization.

Intelligent synchronization is synchronization executed based on variable configuration parameters, which enable the possibility of only some of the patient data and/or patient information to be synchronized as opposed to all of the available data being continuously synchronized. By using custom business rule logic to intelligently determine which patient data and/or information should be synchronized, and which patient data and/or information should be synchronized, the DMS functions more efficiently and can service an increased number of clients and configurations. By way of non-limiting example, prior to a user logging on to the DMS via a computing device, no specific patient data and/or information is synchronized. Instead, only a patient census list and specific data elements corresponding to particular patients are synchronized between the DMS and the information system(s). Once the user logs on, and selects a particular patient to review, the synchronization services begin synching all of the available patient data and/or information for that particular patient. Consequently, subsequent reviews of the particular patient are much faster, because the patient data and/or information has been synchronized.

The adapter services module 324 is the mechanism that retrieves data from the information systems, through the connectivity mechanism modules 308a, 308b, . . . , 308q, and that structures the data for the DMS. The data is formatted and rules are applied for the specific DMS, for which the adapter has been written, regardless of whether the data is directly requested for a client through the integration services module 322, or is retrieved through the synchronization services module 408. The configuration module 414 captures configuration settings used by the data sources 310a, 310b, . . . , 310q. The configuration module 414 can use already existing configuration information so that it does not have to be replicated in the DMS. By way of non-limiting example, all of the patient beds of a particular facility, and to which unit(s) they belong, are typically stored in a data source of the facility. The configuration module 414 reduces, or obviates manual effort in entering the configuration information. The configuration module 414 can also prevent problems from occurring when a configuration change is made in the data sources 310a, 310b, . . . , 310q, but a system administrator forgets to make the change in the DMS.

The authentication module 416 handles the authentication needs of the DMS, which can include, but are not limited to, active directory authentication, vendor authentication, device ID restrictions, device phone number restrictions, and any combination thereof. Each facility system and/or facility is configured to authenticate using any combination of such authentication mechanisms. Device ID restriction is the ability for an authentication service to look at a pre-configured list of device ID's, associated with respective computing devices 302a, 302b, . . . , 302n, that are authorized to connect to the facility system and/or facility, and only authorizes call from software client that originate with that device ID (i.e., from the particular computing device). The device phone number restriction restricts access to computing devices 302a, 302b, . . . , 302n that have a phone number that has been pre-configured in the authentication system.

The ADT module 408 enables the use of existing ADT interfaces within the facility system and/or facility to obtain patient admission, discharge and transfer information in order to always know which patient is associated to which bed and/or unit. The patient data module 420 provides all waveform and non-waveform patient data and/or information from the data sources to the DMS. The patient data module 420 can also provide all waveform and non-waveform acquired from a data acquisition system such as the AirStrip data collector or an independent data collecting system including but not limited to Capsule Technologies' Data Captor system. This includes, but is not limited to, all nursing charting information as well as any automated means of data collection used by the data sources.

In the example structure 400 illustrated in FIG. 4, each connectivity mechanism module 308a, 308b, . . . , 308q includes a database module 422, a web services module 424, a request module 426, and an application layer protocol module 428. By way of non-limiting example, the request module 426 can manage HTTP requests, and/or the application layer protocol can include the health level seven (HL7) application layer protocol. The connectivity mechanism module enables the DMS to connect to and communicate with the particular data source. In some implementations, the connectivity mechanism module can include application protocol interfaces (APIs), through which it communicates with the data source. In other implementations, the connectivity mechanism module can directly access the data source.

In the example healthcare scenario, application developed using the ADP of the present disclosure enable a healthcare provider, or user of the computing devices 302a, 302b, . . . 302n, with secure, remote access to patient data and/or patient information. More particularly, a single application can be developed and can be deployed across disparate device types that operate using respective operating systems. As used herein, the term patient data refers to physiological data that can be obtained from the patient monitoring device(s), and/or physiological patient data that is input into the data sources by a local healthcare provider (e.g., a nurse, or physician). The term patient information refers to information corresponding to a particular patient that is input into the data sources by the local healthcare provider. Example patient information can include, but is not limited to, the patient's name, the name of the doctor(s) assigned to the patient, the nurse(s) assigned to the patient, a facility identification, a patient bed identification, a summary of key patient data, and/or chart annotations. In the example case of a maternity patient, the key patient data can include, but is not limited to, delivery progress information such as cervical exam status, membrane status, gravida, para, epidural status, and/or whether the patient is attempting a vaginal birth after cesarean (VBAC).

Each computing device 302a, 302b, . . . , 302n can have an application installed thereon. The application can execute as a client-side application that communicates with a corresponding server-side application (e.g., executed on a server system). By way of non-limiting example, the application can include AirStrip OB provided by AirStrip Technologies, LLC. AirStrip OB can be provided as an application that mobilizes maternal/fetal waveforms (CTGs), annotations, exam status, medications, lab values, logistical information, and progress notes to improve communication during labor and delivery. The computing devices 302a, 302b, . . . , 302n have respective user interface engines installed thereon to interpret instructions provided by the application. For example, the computing device 302a can have a user interface engine installed thereon that is specific to the platform (operating system) 304a, and the computing device 302b can have a user interface engine installed thereon that is specific to the platform (operating system) 304b.

Each computing device 302a, 302b, . . . , 302n can receive patient data from one or more of the data sources 310a, 310b, . . . , 310q through respective connectivity mechanisms 308a, 308b, . . . , 308q and the intermediary components 106. Each computing device 302a, 302b, . . . , 302n can process the patient data to populate charts and/or tables provided in the application with the patient data. In this manner, charts such as waveforms can be displayed. Navigation features can be provided that enable the user to manipulate a view of the waveform display and/or select between charts and/or tables to be displayed. In some examples, the user can zoom in/out of the displayed image. In this manner, the user can view very specific waveform information, and/or other waveform micro-characteristics by zooming in, for example, and/or can view patterns or other waveform macro-characteristics by zooming out, for example. In some examples, the user can scroll forward or backward through the waveform display. In this manner, the user can view historical patient data.

In some implementations, the user interface engine supports a plurality of applications installed on the respective computing device. For example, a first application and a second application can each be installed on the computing device. The first application and the second application can each be agnostic to the particular operating system of the computing device. That is, neither the first application nor the first application is specific to the particular operating system. A user interface engine executed on the computing device can interpret instructions provided by the first application and/or the second application to display respective GUIs of the first application and the second application.

Figure 5:
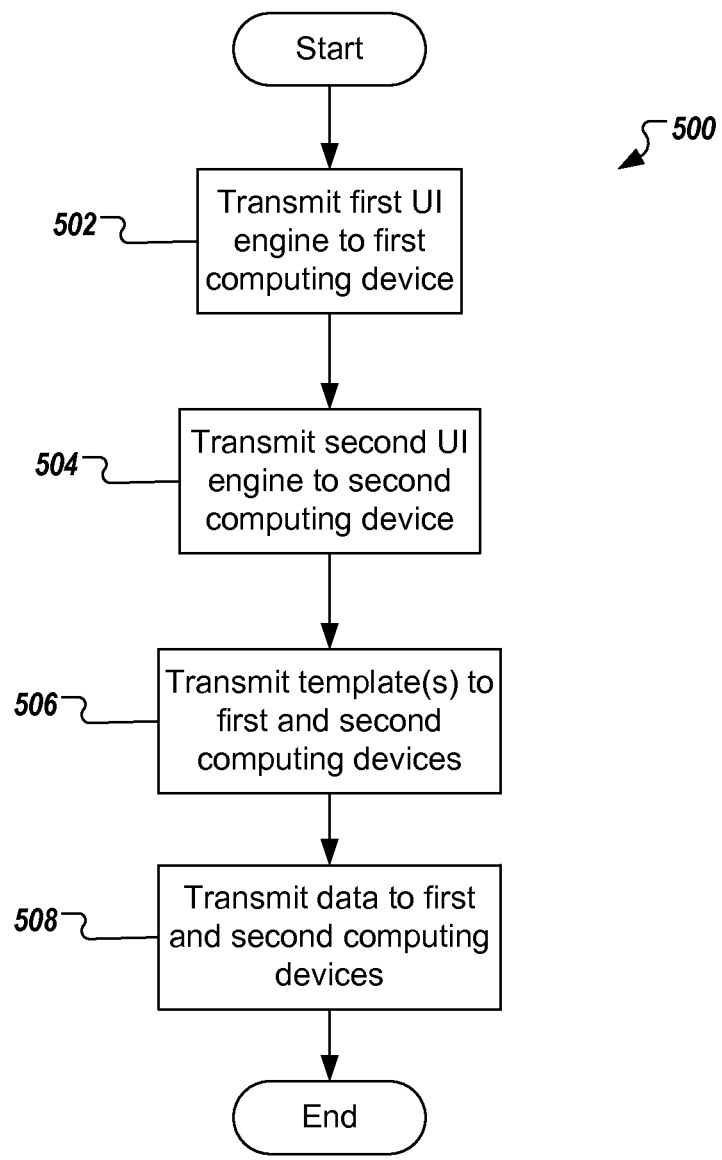
FIG. 5 is a flowchart of an example process that can be executed in accordance with implementations of the present disclosure.

FIG. 5 is a flowchart depicted an example process 500 that can be executed in implementations of the present disclosure. A first user interface engine is transmitted to a first computing device (502) and a second user interface engine is transmitted to a second computing device (504). As discussed herein, the first user interface engine can be executable on the first computing device and can be specific to a first operating system of the first computing device. Similarly, the second user interface engine can be executable on the second computing device and can be specific to a second operating system of the second computing device. In some examples, the first operating system is different from the second operating system. One or more templates are transmitted to the first computing device and the second computing device (506). In some examples, the one or more templates are agnostic to the first operating system and the second operating system. The one or more templates can be provided in an application that is downloaded to each of the first and second computing devices and are processable using the first user interface engine and the second user interface engine to display a first user interface and a second user interface on the first mobile device and the second mobile device, respectively. Data is transmitted to each of the first computing device and the second computing device (508). The first computing device and the second computing device can process the data using the first user interface engine and the second user interface engine to display the data in each of the first user interface and the second user interface.

The ADP of the present disclosure enables the time-to-market of applications to be significantly reduced. Further, and because the applications generated using the ADP of the present disclosure are operating system agnostic, development time and costs can be reduced, because applications specific to each operating system do not need to be developed and/or maintained. Applications (and the underlying templates of the applications) are agnostic in that they are not specific to a particular operating system. Applications developed using the ASP of the present disclosure can be generated using reusable software components (e.g., charts, tables plot areas, legends, etc.) maintaining the native GUI advantage and user experience. Further, the ADP of the present disclosure enable applications to be deployed as a native client, with respect to individual computing devices, but centrally managed (e.g., at a server system) allowing application upgrades to be done automatically from the server system. Further, applications can be provided in a hosted cloud environment.

The ADP of the present disclosure also improves the scalability of development teams, and enables third parties to build display components (e.g., charts, tables plot areas, legends, etc.). In some examples, specialized content can be accessed through a hyperlink (i.e., to a URL) provided in the application.

The ADP of the present disclosure further enables applications to be created without writing source code. For example, an application can be constructed by defining one or more templates that define pages of a UI for the application. The templates can be constructed by assembling pre-defined components (e.g., charts, tables plot areas, legends, etc.) using the GUI 200 of FIG. 2. In some examples, hybrid applications can be created with custom coding when needed to handle very custom types of data (e.g., patient data waveforms). Further, applications can be customized such that, when a particular UI element is touched, a customized screen can be displayed. For example, if a particular partner wants to customize what happens when the user clicks on an a data point displayed within a waveform, the customization can be achieved without having to write additional source code and without having to redeploy the customization as part of a new application.

In some examples, the ADP supports modifications to a theme of the application without having to redeploy the application. For example, the entire look and feel of the application (i.e., modification of component layout, colors, fonts, images, etc.) can be changed with without having to redeploy the application. In some examples, this can be achieved by modifying the one or more templates that define pages of the UI for the application.

The ADP further supports dynamic integration of sources of data (e.g., Web services) into an application through simple configuration. Continuing with the example healthcare scenario, if a hospital wants to add a tab to display their internal on-call system, they can do this customization themselves and their site will show this extra tab. The list of physicians who are on call can have a URL that causes clicking on the physician to display the call schedule.

The ADP further enables caching of data based on sophisticated caching policies (e.g., memory cache or disk cache). In some examples, caching enables an application to recall the last display screen a user was viewing. This can be beneficial, for example, when the user receives a phone call or text message, which technically shuts the application down. When the user re-launches the application, the last display screen can be displayed.

The ADP further provides multi-application support. In some examples, a single application can be provided (e.g., associated with a particular vendor) and can enable access to a plurality of sub-applications. For example, then the application is launched, a menu can be displayed, from which a user can select a sub-application. In this manner, a single application can be deployed (i.e., made available to users for download) without having to deploy each sub-application individually.

The present disclosure can be implemented in digital electronic circuitry, or in computer hardware, firmware, software, or in combinations thereof. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Such a computer program can include modules and/or code segments for executing one or more of the features, aspects and/or implementations provided herein.

Method steps of the present disclosure can be performed by one or more programmable processors executing a computer program product to perform functions of the present disclosure by operating on input data and generating output. By way of one non-limiting example, a computer program product can include modules and/or code segments corresponding to each of the method steps, aspects and/or features provided herein. Method steps can also be performed by, and apparatus of the present disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

The present disclosure can be implemented in a system including, but not limited to the example systems described herein, which include a back-end component, e.g., as a data server, or that includes a middleware component, e.g., an application server, or that includes a front-end component, e.g., a client device, such as the remote device 12, having a graphical user interface or a Web browser through which a user can interact with an implementation of the invention, or any combination of such back-end, middleware, or front-end components. The components of the system can be interconnected by any form or medium of digital data communication, e.g., a communication network.

A number of implementations have been described. Nevertheless, it will be understood that various modifications may be made without departing from the spirit and scope of the disclosure. For example, steps of the invention can be performed in a different order and still achieve desirable results. Accordingly, other implementations are within the scope of the following claims.

What is claimed is:

1. A computer-implemented method executed using one or more processors, the method comprising:
    transmitting, by a server system, a first user interface engine application to a first computing device, the first user interface engine application being executable on the first computing device and the first user interface engine application being specific to a first operating system of the first computing device; transmitting, by the server system, a second user interface engine application to a second computing device, the second user interface engine application being executable on the second computing device and the second user interface engine application being specific to a second operating system of the second computing device, the first operating system being different from the second operating system;
    transmitting, by the server system, at least one template of one or more templates to the first computing device, the at least one template being agnostic non-specific to the first operating system and to the second operating system, and the at least one template being processable using the first user interface engine application to display a first user interface on the first computing device; and
    transmitting, by the server system, the at least one template to the second computing device, the template being processable using the second user interface engine application to display a second user interface on the second computing device;
    wherein the first user interface engine application and the second user interface engine application comprise a first template engine and a second template engine, respectively, the first template engine being specific to the first operating system and the second template engine being specific to the second operating system.

2. The method of claim 1, wherein each of the one or more templates defines components to be displayed on a page, the page being included in each of the first user interface and the second user interface.

3. The method of claim 2, wherein the page comprises a first motif when displayed in the first user interface and a second motif when displayed in the second user interface, the first motif being associated with the first operating system and the second motif being associated with the second operating system.

4. The method of claim 1, further comprising receiving user input from an application developer, the user input defining the one or more templates.

5. The method of claim 1, further comprising:
    receiving data; and
    transmitting the data to each of the first computing device and the second computing device to enable the first computing device and the second computing device to process the data using the first user interface engine application and the second user interface engine application to display the data in each of the first user interface and the second user interface.

6. The method of claim 1, further comprising:
    receiving a first request to download an application, the first request being generated from the first computing device; and
    receiving a second request to download the application, the first request being generated from the second computing device;
    wherein transmitting the at least one template to the first computing device and the second computing device occurs in response to the first request and the second request, respectively.

7. The method of claim 1, further comprising:
    receiving a request for data from the first user interface engine application executing on the first computing device and a request for the data from the second user interface engine application executing on the second computing device;
    determining a configuration of a data management system;
    in response to determining the configuration of the data management system, requesting the data from either an adapter services module or a synchronization database; and causing the requested data to be transmitted to each of the first computing device and the second computing device to enable the first computing device and the second computing device to process the data using the first user interface engine application and the second user interface engine application to display the data in each of the first user interface and the second user interface.

8. A computer-readable medium encoded with a computer program comprising instructions that, when executed, operate to cause one or more processors to perform operations comprising:

transmitting, by a server system, a first user interface engine application to a first computing device, the first user interface engine application being executable on the first computing device and the first user interface engine application being specific to a first operating system of the first computing device; transmitting, by the server system, a second user interface engine application to a second computing device, the second user interface engine application being executable on the second computing device and the second user interface engine application being specific to a second operating system of the second computing device, the first operating system being different from the second operating system;

transmitting, by the server system, at least one template of one or more templates to the first computing device, the at least one template being non-specific to the first operating system and to the second operating system, and the at least one template being processable using the first user interface engine application and the second user interface engine to display a first user interface on the first computing device; and transmitting, by the server system, the at least one template to the second computing device, the at least one template being processable using the second user interface engine application to display a second user interface on the second computing device;

wherein the first user interface engine application and the second user interface engine application comprise a first template engine and a second template engine, respectively, the first template engine being specific to the first operating system and the second template engine being specific to the second operating system.

9. A system comprising:

one or more processors; and a computer-readable medium coupled to the one or more processors having instructions stored thereon which, when executed by the one or more processors, causes the one or more processors to perform operations comprising:

transmitting, by a server system, a first user interface engine application to a first computing device, the first user interface engine application being executable on the first computing device and the first user interface engine application being specific to a first operating system of the first computing device;

transmitting, by the server system, a second user interface engine application to a second computing device, the second user interface engine application being executable on the second computing device and the second user interface engine application being specific to a second operating system of the second computing device, the first operating system being different from the second operating system;

transmitting, by the server system, at least one template of one or more templates to the first computing device the at least one template being non-specific to the first operating system and to the second operating system, and the at least one template being processable using the first user interface engine application and the second user interface engine to display a first user interface on the first computing device; and transmitting, by the server system, the at least one template to the second computing device, the at least one template being processable using the second user interface engine application to display a second user interface on the second computing device;

wherein the first user interface engine application and the second user interface engine application comprise a first template engine and a second template engine, respectively, the first template engine being specific to the first operating system and the second template engine being specific to the second operating system.

* * * * *